US008694413B1

(12) United States Patent
Hurewitz et al.

(10) Patent No.: US 8,694,413 B1
(45) Date of Patent: Apr. 8, 2014

(54) COMPUTER-BASED SYSTEMS AND METHODS FOR DETERMINING INTEREST LEVELS OF CONSUMERS IN RESEARCH WORK PRODUCT PRODUCED BY A RESEARCH DEPARTMENT

(75) Inventors: Barry S. Hurewitz, New York, NY (US); Vaughn S. Harvey, New York, NY (US); Robert Treder, New York, NY (US); Scott Solomon, New York, NY (US); Omar Moustafa, Brooklyn, NY (US); Thami Rachidi, Bayonne, NJ (US)

(73) Assignee: Morgan Stanley & Co. LLC, New York, NY (US)

( * ) Notice: Subject to any disclaimer, the term of this patent is extended or adjusted under 35 U.S.C. 154(b) by 39 days.

(21) Appl. No.: 13/402,998

(22) Filed: Feb. 23, 2012

Related U.S. Application Data

(60) Provisional application No. 61/540,695, filed on Sep. 29, 2011.

(51) Int. Cl.
*G06Q 40/00* (2012.01)
(52) U.S. Cl.
USPC ............................................ 705/37; 705/7.31
(58) Field of Classification Search
None
See application file for complete search history.

(56) References Cited

U.S. PATENT DOCUMENTS

| 7,010,495 | B1 | 3/2006 | Samra et al. | |
|---|---|---|---|---|
| 7,689,490 | B2 | 3/2010 | Hurewitz | |
| 7,734,517 | B2 | 6/2010 | Hurewitz | |
| 7,752,103 | B2 | 7/2010 | Hurewitz | |
| 7,769,654 | B1 | 8/2010 | Hurewitz | |
| 7,805,330 | B2 | 9/2010 | Johnson et al. | |
| 7,904,364 | B2 | 3/2011 | Hurewitz | |
| 7,953,652 | B1 | 5/2011 | Hurewitz | |
| 2002/0138285 | A1* | 9/2002 | DeCotiis et al. | 705/1 |
| 2003/0229531 | A1* | 12/2003 | Heckerman et al. | 705/10 |
| 2006/0224445 | A1* | 10/2006 | Axe et al. | 705/14 |
| 2008/0249832 | A1* | 10/2008 | Richardson et al. | 705/10 |
| 2010/0145757 | A1 | 6/2010 | Hurewitz | |
| 2011/0047072 | A1 | 2/2011 | Ciurea | |
| 2011/0087530 | A1 | 4/2011 | Fordyce, III et al. | |
| 2011/0087531 | A1 | 4/2011 | Winters et al. | |
| 2011/0093327 | A1 | 4/2011 | Fordyce, III et al. | |

(Continued)

OTHER PUBLICATIONS

Solomon, Stephen, The next next thing, Jun. 2000, Inc, v22, No. 8, pp. 84-95.*

(Continued)

*Primary Examiner* — Rajesh Khattar
*Assistant Examiner* — Carol See
(74) *Attorney, Agent, or Firm* — K&L Gates LLP

(57) ABSTRACT

Computer-based systems and methods that determine interest profiles of contacts of work product. The contact interest profiles may indicate the contacts' interests in particular topics of research work product and/or analyst teams within the research department that produced the research work product. The contacts' interest profiles may be determined based on research work product accessed by the contacts according to topic and/or analyst team that produced the research work product, the interaction of the contacts with the research department, and any other reliable information indicative of the contacts' topic and/or team interests. Also, research work product items produced by the entity may be rated for each contact based on, for example, the topic(s) of the research work product items and the analyst teams that produced the research work product items, as well as the contacts' topic and/or analyst team interests.

17 Claims, 6 Drawing Sheets

(56) References Cited

U.S. PATENT DOCUMENTS

Figure 1:
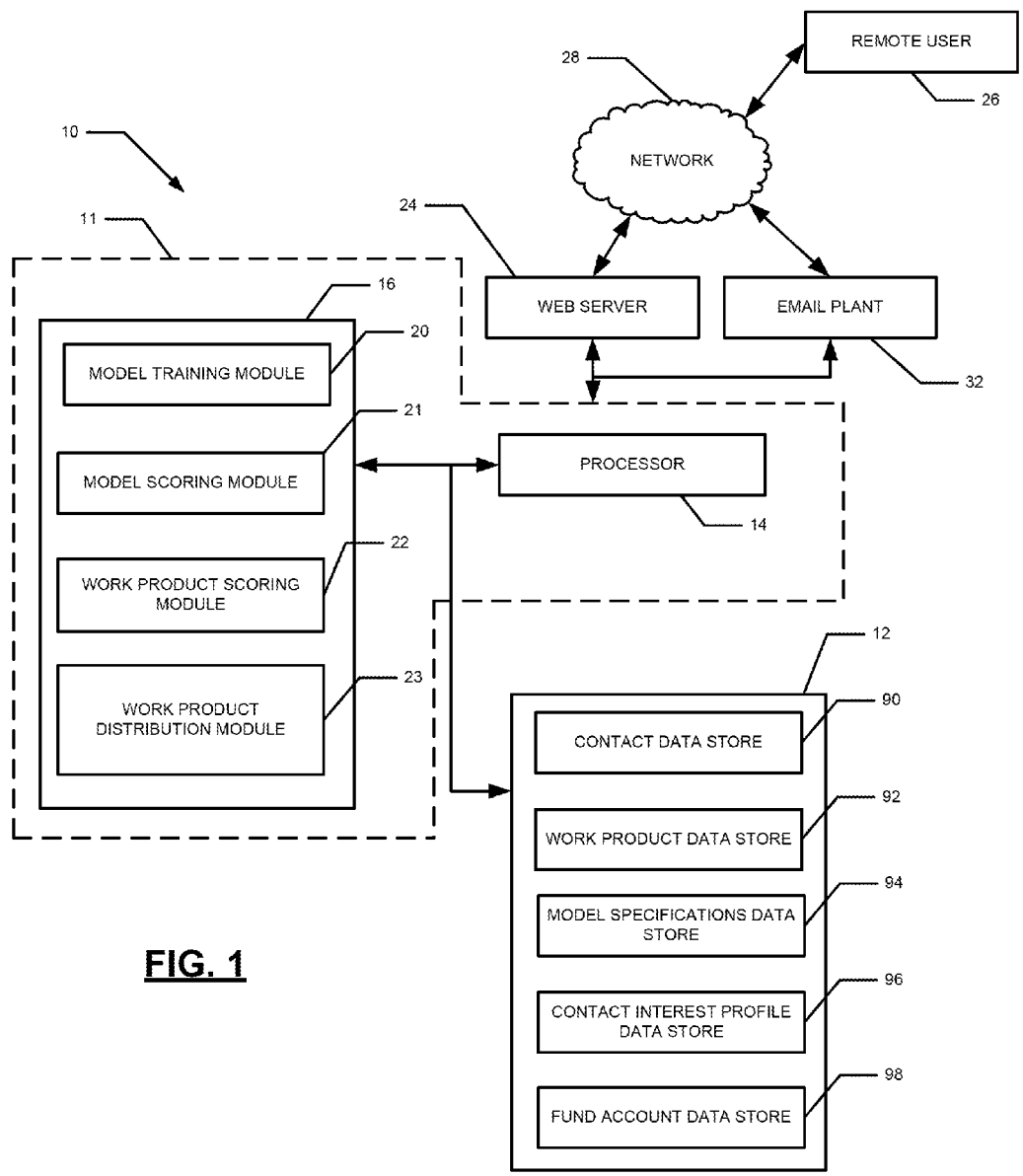

| | | |
|---|---|---|
| 2011/0145164 A1* | 6/2011 | Lavoie et al. ............... 705/36 R |
| 2011/0231225 A1 | 9/2011 | Winters |
| 2011/0231258 A1 | 9/2011 | Winters |
| 2011/0264581 A1 | 10/2011 | Clyne |
| 2011/0302036 A1 | 12/2011 | Fordyce, III et al. |

OTHER PUBLICATIONS

Toscher, Andreas et al., The BigChaos Solution to the Netflix Grand Prize, AT&T Labs Research, Sep. 24, 2009.*

A. Töscher and M. Jahrer (2008), "The BigChaos solution to the Netflix Prize 2008".

F. Rabb et al, "Optimal recommender systems blending," Proceedings of the International Conference on Web Intelligence, Mining and Semantics (2011).

McCarty et al., "Segmentation approaches in data-mining: A comparison of RFM, CHAID, and logistic regression," Journal of Business Research 60 (2007) 656-662.

Wei-Yin Loh, "Classification and Regression Trees," 2011 John Wiley & Sons, Inc., vol. 1, Jan./Feb. 2011.

* cited by examiner

COMPUTER-BASED SYSTEMS AND METHODS FOR DETERMINING INTEREST LEVELS OF CONSUMERS IN RESEARCH WORK PRODUCT PRODUCED BY A RESEARCH DEPARTMENT

PRIORITY CLAIM

The present application claims priority to and incorporates by reference the entirety of U.S. provisional patent application Ser. No. 61/540,695, filed Sep. 29, 2011.

BACKGROUND

In the securities research industry, so called "sell-side firms" provide, among other things, research regarding securities (such as stocks or bonds) to, among others, so-called "buy-side firms," which are typically institutional investors such as mutual funds, hedge funds, pension funds, etc. Particularly for equity research, sell-side firms typically employ a number of analyst teams that analyze and publish research reports about equity securities for publicly-traded companies in different industry sectors and/or geographic regions. For example, a sell-side firm may have a North America pharmaceuticals research team that analyzes North American publicly-traded pharmaceutical companies, a North America oil services research team that analyzes North American publicly-traded oil services companies, a North America semiconductors research team that analyzes publicly-traded companies that make and sell semiconductor products, and so on. The sell-side firm might also have corresponding European and/or Asian research analyst teams.

The analyst teams typically include a primary analyst and several research associates, though some teams may have other positions as well. These research teams generate numerous different types of research touch points for consumers of the research (e.g., the buy-side firms). The research touch points may include research reports (e.g., published electronic or hard copy reports), one-to-one telephone calls or meetings with contacts at the buy-side firms, tailored or blast emails and voicemails to such contacts, and/or other events such as seminars, conferences, corporate road shows, and meetings with corporate management.

A sell-side firm also typically employs salespeople who facilitate the distribution of the work product of the various research teams to appropriate contacts at the buy-side firms. The contacts typically are associated with one or more investment funds or accounts of the buy-side firm. A sell-side salesperson typically has contacts at many different buy-side firms, and those contacts may be interested in research work product from many different analyst teams at the sell-side firm. One role of a sell-side salesperson is to alert and distribute to his/her contacts work product from the various sell-side analyst teams.

SUMMARY

In one general aspect, the present invention is directed to computer-based systems and methods that determine interest scores for contacts (e.g., consumers) of a research entity in research work product items produced by the research entity where the interest scores are indicative of the contacts' interest or propensity to read the work product items. An interest score may be computed for each contact for a number of each work product items. In various embodiments, the research may relate to publicly traded securities (e.g., tickers) and the research entity may have a number of analyst teams that produce the research work product items. The interest scores may be computed based on at least the following data: (i) data regarding the research work product items produced by the entity that were accessed by each of the contacts; (ii) data regarding communication interactions between each of the contacts and each of the teams of the research entity; (iii) data indicating one or more topics covered by each research work product item produced by the research entity; and (iv) data indicating which team produced each research work product item produced by the research entity. In various embodiments, a propensity model is used to compute each contact's propensity to read (or otherwise access) work product items related to particular topics and/or produced by particular teams of the research entity. The work product item scores are then computed for a number of work product items based on the contacts' propensity scores, as well as the topic(s) of each work product item and the analyst team that produced the work product items. Other data may also be used to determine the contacts' propensities to read particular work product items, such as the contacts' broker votes and/or trades and holdings of accounts associated with the contacts.

These and other aspects of the present invention are described below.

FIGURES

Various embodiments of the present invention are described herein by way of example in conjunction with the following figures, wherein:

FIG. 1 is block diagram of a computer system according to various embodiments of the present invention; and FIGS. 2-6 are flow charts of process flows for of the computer system of FIG. 1 according to various embodiments of the present invention.

DESCRIPTION

Various embodiments of computer-based systems and methods of the present invention are described below. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and illustrative. Variations and changes thereto may be made without departing from the scope of the claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation.

FIG. 1 is a diagram of a computer-based system 10 according to various embodiments of the present invention. The computer-based system 10 may comprise one or more networked, electronic computer devices 11, such as servers, personal computers, workstations, mainframes, laptops, and/or handheld computing devices. As shown in FIG. 1, the system 10 may comprise a computer-based data storage system 12, one or more processor circuits 14, and one or more memory units 16. For convenience, only one processor circuit (referred to hereinafter simply as "processor") 14 and one memory unit 16 are shown in FIG. 1, although it should be recognized that the computer system 10 may comprise multiple processors and/or multiple memory units 16. The memory 16 may store a number of software modules, such as modules 20-23 as shown in FIG. 1. The modules 20-23 may comprise software code that is executed by the processor 14, which execution causes the processor 14 to perform various actions dictated by the software code of the various modules, as explained further below. The processor 14 may have one or multiple cores. The memory 16 may comprise primary computer memory, such as a read only memory (ROM) and/or a random access memory (e.g., a RAM). The memory could also comprise secondary computer memory, such as magnetic or optical disk drives or flash memory, for example.

The data storage system 12 may comprise a number of data stores, which may be implemented as computer databases, data files, directories, or any other suitable system for storing data for use by computers. The data storage system 12 may be embodied as solid state memory (e.g., ROM), hard disk drive systems, RAID, disk arrays, storage area networks (SANs), and/or any other suitable system for storing computer data. In addition, the data storage system 12 may comprise caches, including web caches and database caches. The data storage system 12 may be part of the computer device(s) 11 or connected to the computer device(s) 11 via a network connection.

Embodiments of the present invention are described herein in the context of a sell-side equity research department that provides research work product to contacts at buy-side firms, where the equity research department comprises, among other things, multiple analyst teams that cover different industry sectors and/or geographic regions, and salespeople at the sell-side firms that have contacts at the buy-side firms/accounts. It should be noted that the analyst teams preferably also have contacts at the buy-side firms. In addition, different salespeople and/or analyst teams may have one or more common contacts at a buy-side firm. The collective contacts of the various salespeople and analyst teams of the equity research department are sometimes referred to herein as contacts of the equity research department.

While embodiments and aspects of the present invention are described herein in the context of a sell-side equity research department, it should be noted that the embodiments and aspects of the present invention are not necessarily limited to sell-side equity research departments unless specifically noted, and that embodiments or aspects of the present invention described herein may be applicable to industries other than sell-side equity research departments, such as fixed-income research departments, other types of research departments that produce research work product that is consumed by clients or customers of the research department, or applicable to any organization or enterprise with customers, clients or contacts, for example.

As shown in FIG. 1, the computer system 10 may comprise: (i) a model training module 20 that trains the model used to determine the likely interests of the contacts of the equity research department; (ii) a model scoring module 21 that determines the contacts' interest profiles; (iii) a work product scoring module 22 that determines an interest level (e.g., a score) of contacts of the equity research department in work product produced by an equity research (or other research) department, such as research reports, etc.; and (iv) a work product distribution module 23 that, for example, determines which contacts should be called (e.g., by telephone) and which contacts should be emailed in response to, for example, recently generated research work product by the research department. The work product distribution module 23 may also provide a graphical user interface that facilitates such communications with the contacts.

The data storage system 12 may comprise, for example, contact data store 90, a work product data store 92, a model specifications data store 94, a contact interest profile data store 96, and a fund account data store 98. The contact data store 90 may store data regarding the contacts of the equity research department, including contact information for the contacts (employer, associated investment funds and accounts, email addresses, mailing addresses, phone numbers, etc.), in addition to data regarding interaction between the various contacts and members of the sell-side equity research department, such as emails, phone calls, and meetings involving the various contacts and members of the equity research department. This interaction-type data may include the date, time, duration, participants and/or topic(s) of the interaction. The data may be entered into the contact data store 90 by employees/agents of the research department. The contact data store 90 may also store what research work products the contacts accessed (e.g., downloaded) and when. The work product data store 92 may store research work product produced by the analyst teams, such as electronic copies of research reports and other work product of the analyst teams, in addition to data about the research work product (e.g., metadata), such as the date of creation, the analyst team that produced the report, the companies, industry sectors, and/or geographic regions to which the research work product pertains. More details regarding such data stores 90-92 may be found in the following patent documents that are incorporated herein by reference in their entirety: U.S. Pat. No. 7,734,517; U.S. Pat. No. 7,689,490; U.S. Pat. No. 7,769,654; U.S. published patent application Pub. No. 2010/0290603; and WO 2007/038587 A2.

The model specifications data store 94 may store the parameters and/or specifications for the model used to generate the contact interest profiles, as described further below. The contact interest profile data store 96 may store the interest profiles of the contacts determined by the model scoring module 21, as described in more detail below. The fund account data store 98 may store data about the holdings and trade flow of the accounts associated with the contacts.

The computer system 10 may also include one or more web servers 24 in communication with the computer 11. The web server 24 may host web sites accessible by a remote user 26, via an electronic data communication network 28. The network 28 may comprise one or more LANs, WANs, the Internet, and/or an extranet, or any other suitable data communication network allowing communication between computer systems. The network 28 may comprise wired and/or wireless links. The computer system 10 may also comprise a computer-based email plant 32. The computer-based email plant 32 may be implemented as one or more computer servers that handle the email protocol for the organization or enterprise associated with the computer system 10. The email plant 32 may facilitate the sending and receiving of internal and external emails via the computer data network 28.

A typical sell-side global equity research department may include hundreds of analyst teams worldwide, such as 100-300 different worldwide analyst teams. The various analyst teams may collectively cover numerous (e.g., thousands, such as 5000 or more) stocks that are publicly traded on stock exchanges worldwide (such as North American exchanges, (e.g., the New York Stock Exchange and NASDAQ), European exchanges (e.g., the London Stock Exchange and Euronext), Asian exchanges (e.g., Tokyo and Shanghai stock exchanges), etc.). Such publicly-traded stocks are commonly referred to, and are sometimes referred to herein, as "tickers" because each publicly traded stock is ordinarily associated with a ticker symbol. In addition, the various analyst teams in an equity research department collectively generate numerous research work products every business day (e.g., trading days of the various exchanges). For example, the various analyst teams in an equity research department may collectively generate 100 to 200 research reports or other work product in a given business day, at various times throughout the business day, but ordinarily concentrated around the opening of the local stock exchange. A typical global equity research department also has numerous buy-side contacts (e.g., 5000 or so buy-side contacts) associated with various investment funds or accounts.

One goal of an equity research department is to efficiently disseminate research work product to contacts interested in the work product. In various embodiments, the computer system 10 aids in achieving this goal. The model scoring module 21 may determine interest profiles for the various contacts of the equity research department. Based on the contact interest profiles, the work product scoring module 22 may compute an interest level for some or all of the contacts of the equity research department in each research work product generated by the equity research department over a time period (such as the current day, week, etc.). The work product distribution module 23 may assist the equity research department (e.g., salespeople of the equity research department) in disseminating the research work product to the various contacts of the equity research department in an efficient matter based on the computed interest levels for the contacts in the research work product.

A contact interest profile may indicate, for example, a contact's interest in particular tickers, analyst teams, geographic region or sub-region, and research work product types, although in other embodiments different contact interests may be profiled, such as sector or industry interests, etc. Preferably, the interest scores are propensity scores that are indicative of the contacts' propensities to read a work product item given its topic(s), analyst team, type, and the geographic region/sub-region of the ticker(s) involved. The research work product types may include, for example: (i) research reports (which may be embodied, for example, as word processing or pdf files) that focus on a particular ticker(s) or industry(ies) or geographic region(s); (ii) trade ideas that provide possible trading strategies or ideas for an investment fund or account (which may be embodied, for example, as word processing, spreadsheet, or pdf files); or (iii) models that may, for example, provide valuation models for a ticker(s) (which may be embodied, for example, as spreadsheet files), although in other embodiments different research work product types may be profiled. The geographic region/sub-region data may track the geographic region(s)/sub-region(s) for which the contact reads or accesses work product items. The geographic regions may be, for example, North America, UK, Europe ex UK, Japan, Asia ex JP, etc. Sub-regions may be a country or group of countries within those regions. If a contact consistently reads reports about tickers associated with a particular region and/or sub-region, or has analyst team interactions with analyst teams associated with a particular region or sub-region, the contact's interest profile can show an interest in those regions/sub-regions.

The interest profiles, which may be stored in the contact interest profile data store 96, may include, for example, a team component which indicates a particular contact's interest in the various analyst teams of the equity research department, a ticker component which indicates a particular contact's interest in various tickers covered by the analyst teams, a research work product type component which indicates a particular contact's interest in the various research work product types generated by the analyst teams, and/or a geographic region/sub-region component that indicates the geographic region(s)/sub-region(s) in which the contact has an interest.

The contact interest profiles, as explained below, may be determined based on contact data stored in the contact data store 90 and/or data stored in the fund account data store 98 and/or any other relevant data. The contact data may include data that generally indicate the contact's interactions with the equity research department regarding particular tickers and analysts teams. For example, the contact data may indicate what research work product the contact read or otherwise accessed, which analyst teams the contact talked with on the phone or in meetings, the topics (e.g., tickers) that were the subject of such calls or meetings, etc. Whether a document has been read or otherwise accessed by a contact can be determined based on whether the contact downloaded the document, such as via the internet or some other electronic data communication network, from an electronic research work product repository of the equity research department. The contact may be, for example, required to input credentials (e.g., ID and password) or use a personalized hyperlink to access work product for downloading, thereby indicating which contacts downloaded or otherwise accessed which research work product. The fund account data store 98 may store data indicative of the holdings and/or trade flow of accounts or investment funds associated with the contact. Some or all of this data, or additional data, may be used to determine the interest profiles for some, but preferably all, of the contacts of the equity research department. In addition, the interest profiles may be updated from time to time or periodically based on updated data. For example, the contact profiles for the various contacts of the equity research department may be updated daily, weekly, monthly, quarterly, annually, or at some other frequency that is acceptable and practical for the particular equity research department.

Figure 2:
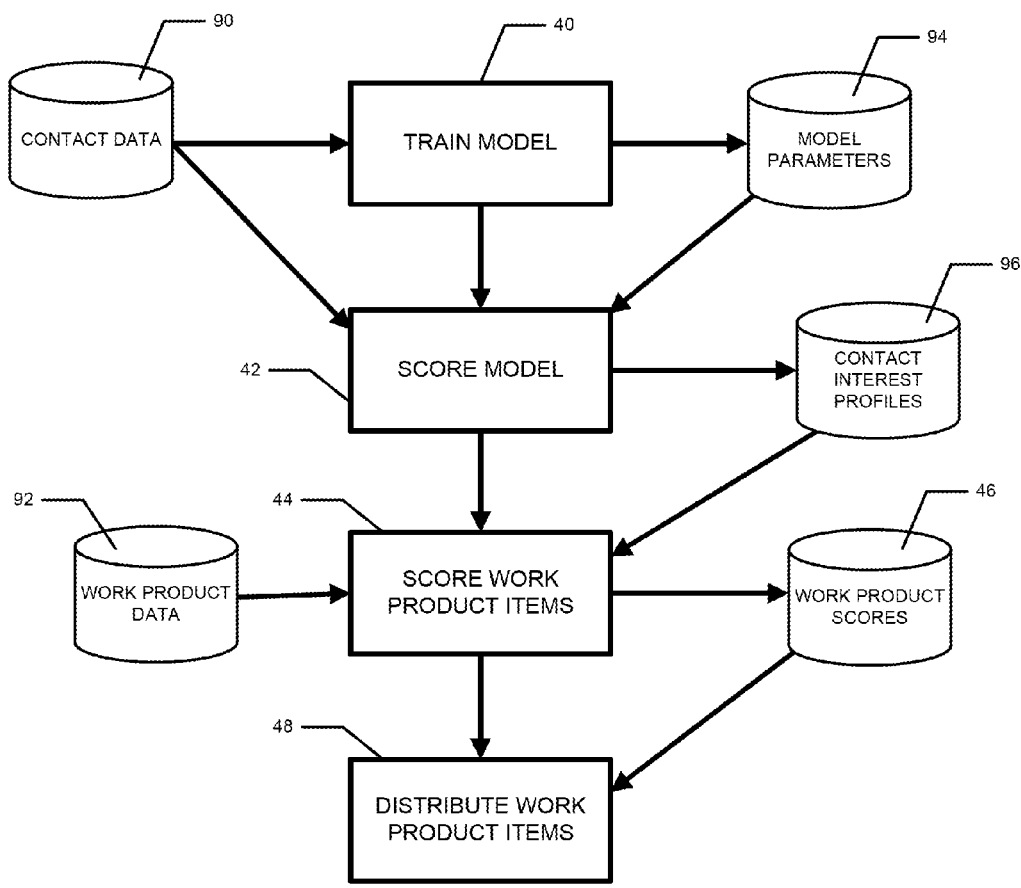

One or more mathematical predictive models may be used by the model training and scoring modules 20-21 to generate the contact interest profiles. For example, a propensity model may be used to predict the likelihood (or propensity) that a contact will read particular research work product items, although in other embodiments different predictive models may be used. FIG. 2 is a flow chart of an example process flow for determining the work product scores for the contacts using a propensity model. At block 40, the propensity model is trained using the model training module 20 to generate the model parameters (e.g., coefficients, adjusted propensity scores, etc.) for the model, which can be stored in the model specifications data store 94. The model is trained using the contacts' data stored in the contact data store 90. More details about generating and training the model are provided below. Training of the model can occur periodically or from time to time. In various embodiments, the model is training every two weeks, monthly, or some other suitable frequency.

At block 42, the model is scored by the model scoring module 21 in order to generate the contact interest profiles 96. The model scoring module 21 uses the contact data stored in the contact data store 90 and the model parameters 94 to compute the contact interest profiles 96. The model may be scored periodically or from time to time. It may be scored more frequently than it is trained. For example, the model may be scored every day or every couple of days, for example. Next, at block 44, the research work product items are scored for each contact by the work product scoring module 22 to generate the work product scores 46 based on the work product data 92 and the contact interest profiles 96. The work product scores may be computed periodically or from time to time. Preferably the work product scores are computed every time there are new work product items to distribute, which may be every business day for a productive research department. Next at block 48, the work product distribution module 23 may determine how the work product items should be distributed based on the work product scores 46.

As mentioned above, the propensity model may use different types of data in order to compute the contacts' interest profiles. The types of data may include data about the contacts, data about the analyst teams, and data about the accounts associated with the contacts. The data about the contacts may include: (i) data about research work product items read (or accessed) by the contacts; (ii) data about interactions by the contacts with the various analyst teams; and (iii) data about broker votes (described further below) by the contacts. Data about research work product items read (or accessed) by the contacts may include: a contact ID for the contact; an account ID for the account(s) associated with the contact; document ID and read date for documents (e.g., work product items) read/accessed by the contact; team ID for the analyst team that produced each work product item read by the contact; and the time (e.g., number of days) since read. The data about interactions by the contacts with the various analyst teams may include: an ID for each interaction; an interaction date; and interaction time; a duration of the interaction (which may be pro rated; e.g., a 30 minute meeting with 3 contacts may be pro rated to 10 minutes for each contact); an interaction type (e.g., email, phone call, conference call, etc.).

Regarding broker votes, often equity research resources generated by the sell-side firm are provided to various buy-side firms and accounts without direct charge. Instead, buy-side firms compensate the sell-side firm for research by utilizing the brokerage services of the sell-side firm to execute trades. The price paid by the buy-side firm for trade execution is intended to compensate the sell-side firm for brokerage services as well as for any equity research resources consumed by the buy-side firm. Accordingly, buy-side firms typically direct their trade execution business to sell-side firms that provide valuable equity research. One common method utilized by buy-side firms is a broker vote. According to a typical broker vote process, a buy-side firm polls its research consumers (typically including contacts at the buy-side firm of the sell-side firm) to identify the sell-side firm or firms that provide research valued by the research consumers. Research consumers may be any buy-side firm personnel who consume equity research, such as fund managers in the buy-side firm and/or their analyst teams. In some embodiments, broker votes may be limited to personnel that make trading decisions based on equity research. The buy-side firm then selects sell-side firms for execution services based on the results of the vote. The broker vote itself may be structured in any suitable fashion. For example, in one embodiment, participating equity research consumers at a buy-side firm rank analysts or analyst teams from different sell-side firms across various, different market sectors, where a first place vote is worth 10 points, a second place is worth 5 points, and a third place vote is worth 3 points. If the total number of points available is from all participating equity research consumers at the buy-side firm is N, and if sell-side firm A received x % of the N available points, then the buy-side firm would direct x % of its trade execution to sell-side firm A in an upcoming time period (e.g., the next calendar quarter or some other period). This process could be repeated periodically, such as every quarter, semi-annually, or annually, for example. In that connection, the broker vote data may comprise: team ID for the analyst team that received the vote; the contact ID for the contact who placed the vote; the account ID for the account(s) of the contact, the number of votes, the total vote points, the vote score, and the vote time period.

The propensity model may also use data about the analyst teams. The analyst team data may comprise the team region (e.g., US, Japan, etc.), the team ID; team name; sector; team revenue; team expense; team profit; and revenue time period. More details about such financial data may be found in: U.S. provisional patent application Ser. No. 61/527,971, filed Aug. 26, 2011, entitled "COMPUTER-BASED SYSTEMS AND METHODS FOR COMPUTING MARKET-ADJUSTED ELASTICITIES FOR ACCOUNTS"; U.S. Pat. No. 7,734,517, entitled "Systems and method for determining the cost of a securities research department to service a client of the department"; and U.S. Pat. No. 7,689,490, entitled "Matching resources of a securities research department to accounts of the department," all of which are incorporated herein by reference in their entirety. The team data may also include contact IDs and associated accounts for priority contacts of the analyst teams. The priority contacts may be determined, for example, using the technique described in U.S. provisional patent application Ser. No. 61/480,911, filed Apr. 29, 2011, entitled "COMPUTER-BASED SYSTEMS AND METHODS FOR IDENTIFYING PRIORITY CONTACTS AND ENTHUSIASTS OF A RESEARCH DEPARTMENT," which is incorporated by reference in its entirety.

The data about the accounts may include data about which accounts are in which tiers (for tiered accounts). The account data may also include data about the trades and holdings of the accounts (stored in the fund account data store 98). In various embodiments, for purposes of determining the contact interest profiles, the account trades and holdings respectively for a ticker may be mapped to the contacts associated with an account if at least one of the following conditions is true:

1. The contact has read a threshold number (e.g., more than one) research work product items pertaining to the ticker (e.g., either about the ticker or the ticker's industry) held or traded by the account;
2. The contact has at least a threshold number (e.g. one) research work product items pertaining to the ticker held or traded by the account in the last N days;
3. The contact has interacted with an analyst team that covers the ticker held or traded by the account; or
4. The contact has voted in a broker vote for the analyst team/analyst that that covers the ticker held or traded by the account.

In addition, the following set of rules may be imposed in various embodiments to the above mappings to ensure that a contact is only assigned trades/holdings located in the regions of the analyst teams that the contact is reading:

If the contact reads research in more than one sub-region all in the same region, then the contact is assigned tickers the account trades/holds in that entire region;

Else, if a contact reads research reports in more than one country all in the same sub-region, then the contact is assigned tickers the account trades/holds in that entire sub-region;

Else, if a contact reads research reports in only one country, then the contact is assigned tickers that the account trades/holds in that country only; and Else (contact has not read any research), the account trades/holding are applied based on rules 1-4 stated above.

The propensity model may use a number of variables that relate to the likelihood of a contact reading a research work product item about a specific ticker or by analyst team. Those variables may include some of the data listed previously about readership, interactions, voting, and account trades/holdings. In additional, a number of derived variables may be used to increase the accuracy of the propensity predictions by the model. According to various embodiments, some or all of the additional derived variables listed in Table I below may be used in the propensity model. These derived variables may include: (i) derived variables related to contact readership (e.g., Nos. 1-7 below); (ii) derived variables related to contact interactions (e.g., Nos. 8-10 below); (iii) derived variables related to ticker popularity (e.g., Nos. 11-13 below); (iv) derived variables related to trades by accounts associated with the contacts (e.g., Nos. 15-21 below); and (v) derived variables related to holdings by accounts associated with the contacts (e.g., Nos. 22-32 below).

TABLE I

| No. | Derived Variable | Description |
|---|---|---|
| 1 | Super interest | An indicator (such as 0 or 1) of heightened interest in a ticker by the contact indicating reading work product that was published before the contact entry date |
| 2 | Currency | How current is the contact's interest (e.g., length of time from published to read) |
| 3 | Interest movement based on interactions | Increasing or decreasing interest based on the contact's interactions |
| 4 | Interest movement based on readership | Increasing or decreasing interest based on the contact's reads |
| 5 | Readership volume | Total number of reads for a ticker (or analyst team) |
| 6 | Readership breadth | Number of different tickers (or analyst teams) read. This variable could also be a ratio of (i) number of different tickers (or analyst teams) read to (ii) total number of different tickers (or analyst teams). |
| 7 | Readership focus | Percent of ticker (or analyst teams) reads |
| 8 | Interaction volume | Total duration of interactions to analyst teams |
| 9 | Interaction breadth | Number of different analyst teams with which a contact has interest. This variable may be computed as a ratio of (i) the number of analyst teams with which the contact interacts to (ii) the maximum number of analyst teams for any contact. |
| 10 | Interaction focus | Contact percent of interactions to analyst team for both count and duration. This variable may be computed as the ratio of (i) the contact's total duration of interactions with the analyst team to (ii) the sum total of the duration of interactions for the contact with analyst teams (or all analyst teams in the geographic region of the contact). |
| 11 | Popularity - interactions | Popularity of ticker (or analyst team) for interactions. This variable may be computed as a ratio of (i) duration of all interactions for a ticker (or analyst team) to (ii) the maximum duration of interaction for any ticker (or analyst team). |
| 12 | Popularity - readership | Popularity of ticker (or analyst team) for readership. This variable may be computed as a ratio of (i) all the reads for a ticker (or analyst team) to (ii) the maximum number of reads for any ticker (or analyst team). |
| 13 | Readership spike | Computed change in overall ticker interest |
| 14 | Number of contacts | Number of active, distinct contacts at an account |
| 15 | Contact trades buy quantity | Quantity of trades bought by account and mapped to the contact |
| 16 | Contact trades price bought | Dollar value of trades bought by account and mapped to the contact |
| 17 | Contact trades sold quantity | Quantity of trades sold by account and mapped to the contact |
| 18 | Contact trades price sold | Dollar value of trades sold by account and mapped to the contact |
| 19 | Account ticker traded count | Number of securities traded at account level |
| 20 | Contact ticker traded count | Number of securities traded at contact level |
| 21 | Trades flag | Indicator (e.g., 1 or 0) depending on whether contact has any trades |
| 22 | Contact shares held | Number of shares held by account and mapped to the contact |
| 23 | Contact value held | Dollar value of shares held by account and mapped to the contact |
| 24 | Contact percent of shares outstanding | Shares held by contact as a percent of issue's total outstanding shares |
| 25 | Account ticker held count | Number of securities held at account level |
| 26 | Contact ticker held count | Number of securities held at contact level |
| 27 | Account percentage of portfolio | Percent of portfolio at account level |
| 28 | Contact percentage of portfolio | Percent of portfolio at contact level |
| 29 | Contact percentage change of shares held | Time-over-time (e.g., quarter-over-quarter) shares held change |
| 30 | Contact percentage change of value held | Time-over-time (e.g., quarter-over-quarter) value held change |
| 31 | Holdings flag | Indicator (e.g., 1 or 0) depending on whether contact has any holdings |

In other embodiments, derived variables related to the documents may also be used, such as:

Whether the document changes a rating for a ticker(s) (e.g., buy, sell or hold)

Whether the document identifies a target price movement for a ticker(s)

Whether the document changes an earnings estimate for a ticker(s)

Whether the document focuses on news related to a ticker(s)

or any other suitable document-type derived variable.

The interest movement variables (Nos. 3-4 in Table I) may attempt to measure changing interest of the contact. One way to calculate this is to look at monthly (or some other time period) proportions of documents read over some period of time (e.g., six months) and compute the regression coefficient indicating increasing, flat, or decreasing interest. This may be computed for each contact-ticker combination to get a better sense of increasing or decreasing interest. In other embodiments, a regression slope for changing interest may be calculated based on the number of work product items available for all tickers and all months. The contacts changing interest in both tickers and analyst teams may be computed.

The goal of the propensity model ideally is to be able to predict the interest level that a contact will have in new information about a company/ticker or industry report produced by the research department. In various embodiments, at least two main branches of information that the research department published may be modeled: (i) information related to a specific ticker; and (ii) information related to a specific analyst team. In the following discussion, the two modeling areas of focus will be referred to as the "ticker interest model" and the "team interest model" respectively.

The predictions produced may be of two kinds. First, if a contact has demonstrated interest in a ticker (or analyst team) by reading ticker (or analyst team) work product items, a raw estimate of the propensity for reading a new ticker (or analyst team) work product item can be computed. The estimate may be the ratio of (i) the number of ticker (or analyst team) documents read to (ii) the total number published for the ticker (or analyst team). In this case, the likelihood to read a document can be modeled directly with the raw propensity scores as the target or dependent variable and various inputs indicating interest, such as trades, holding, and an assortment of derived variables (such as those listed above) measuring a contact's interest behavior. The propensities in this case can be referred to as "direct" ticker (or analyst team) propensities because they are a function of the contact's real, historical behavior.

Second, if a contact has not read any documents for a given ticker (or analyst team) but has shown interest through interactions, votes, and/or the trades/holdings of the contact's account, the likelihood of reading a newly published document or other work product item may be predicted because variable for interactions, votes, trades and holding can be included as predictors in the direct ticker (or analyst team) propensity model. In this case, for those without any document reads (or no read with a certain time period), the likelihood of reading a document can be predicted from the direct ticker (or analyst team) propensity model. The propensities for this case are referred to as "indirect" ticker (or analyst team) propensities.

In various embodiments, for each of the ticker and team (direct or indirect) interest models, a collection of continuous, regression-type models may be used and then blended to produce more accurate results. Once the models are trained, the blend may be achieved by linear regression of the known values of the target variable on the predictions obtained from each of the models. The resulting parameter estimates are the optimal weights for minimizing the mean square error (MSE) as a function of the individual model predictions.

In training the ticker direct propensity models, the contact space may be partitioned based on the number of tickers a contact reads. The contacts could be portioned into a number of segments (or groups), with each contact belonging to one segment, and the segments corresponding to the number of tickers the contact reads. In one embodiment, five segments (or groups) are used as shown in Table II below.

TABLE II

| Group | Number of Tickers Read |
|---|---|
| 1 | 1 |
| 2 | 2-3 |
| 3 | 4-9 |
| 4 | 10-20 |
| 5 | 21 or more |

For the team direct propensity model, the contacts may similarly be partitioned into groups based on the number of analyst teams read. In various embodiments, the team direct propensity model may use the same or a different number of groups as the ticker direct propensity model.

The goal of the ticker indirect model is to compute a ticker interest score for contacts that are not currently (e.g., within the last six months) reading any ticker documents, but have a propensity to do so because the trades and holdings of the contacts' associated accounts, and/or the contacts have show interest via ticker-tagged interactions with an analyst team(s). This propensity may be based on how most closely they resemble contacts that are (i) reading ticker documents, and hence have a direct propensity, (ii) have trades and/or holdings, or (iii) have ticker-tagged interactions.

In various embodiments, some or all of the following predictors may be used by the ticker indirect model:
  The trades and holdings derived variables (e.g., derived variables Nos. 15-32)
  Interaction duration and count by analyst team
  Vote count and points for analyst team
  Ticker documents viewed that are published by analyst team
  Team documents viewed that are published by analyst team
  Team propensity (from team direct model)
  Changes in team reads across contacts (characteristic of a team)
  Changes in team interactions across contacts (characteristic of a team)
  Change in team broker votes across contacts (characteristic of a team)
  Contact changes in team reads (characteristic of a contact)
  Contact changes in team interactions (characteristic of a contact)
  Contact changes in team votes (characteristic of a contact)
  Fund manager flag indicating whether the contact is the manager of a fund (available from public data sources, such as Thompson).

Because the ticker direct and team direct propensity models are needed in various embodiments by the ticker indirect model, the ticker indirect model may be trained after the ticker direct and team direct propensity models.

In various embodiments, K-Means clustering is used to segment the contacts into groups with similar interests for the ticker indirect model. Creating homogenous groups often helps achieving a better model fit. K-Means clustering may be conducted based on the contact activity with analyst teams (e.g., interactions, reads, and/or votes). Different sets of clusters may be tried and, for example, the one exhibiting the highest silhouette coefficient (a measure of within-cluster similarity, and between-clusters similarity) may be used. In one embodiment, the contacts may be segmented into two groups for the ticker indirect model: (1) high readers and low interactors; and (2) high interactors and low readers. A propensity model may be fit for each of the clusters. The model may be built as discussed above using the data with trades/ holdings and ticker-tagged interactions having a direct propensity. The data may be partitioned into a train set and a test set for each of the clusters, with the model built using the train set and tested on the test set. In various embodiments, the following list algorithms are used to train data within each cluster: (i) CHAID with boosting; (ii) CART with boosting; and (iii) Neural Network. CHAID and CART are decision tree models. More details about CHAID may be found in J. Magidson, "The CHAID approach to segmentation modeling: chi-squared automatic interaction detection," R. P. Bagozzi (ed), Advanced Methods of Marketing Research, Blackwell, Oxford, 1994, pp. 118-159. More details about CART may be found in L. Breiman et al., "Classification and regression trees," (1984). The model with the highest gain over the random model may be deployed to score contacts showing interest in tickers through trades, holdings, ticker-tagged interactions, and/or broker votes, but not reading of any ticker documents.

In other embodiments, team indirect propensity models could also be used to score contacts showing interest in analyst teams through trades, holdings, ticker-tagged interactions, and/or broker votes, but not reading of any analyst team documents.

For each of the models (e.g., the ticker direct, team direct, and ticked indirect models), a number of regression-type, preferably continuous, models are fit to each group and then blended to provide more accurate estimates. More details about blending models can be found in A. Toscher and M. Jahrer (2008), "The BigChaos solution to the Netflix Prize 2008" and F. Rabio et al, "Optimal recommender systems blending," Proceedings of the international Conference on Web Intelligence, Mining and Semantics (2011), both of which are incorporated herein by reference in their entirety.

The data setup and modeling plan attempts to find the best fitting models to explain variation in contact interest in (propensity to read) documents published on specific companies (tickers) or by analyst teams. Raw propensity scores computed from the contact's readership history may be transformed to provide a better target variable for modeling. Let the raw propensity to read a document on a ticker (team propensities are computed similarly) be defined as:

$$\rho = \frac{\text{number\_of\_docs\_read}}{\text{number\_of\_docs\_available}} \quad (1)$$

where $\rho$, the propensity to read a ticker-specific document, is based on the number of documents available on that ticker since the contact has entered the system. (Note that in cases where a contact reads documents that were published before the contact entered the system, the denominator is increased by one for each document read published predating the entry date.) Raw propensities $\rho_{ij}$ may be computed for all contacts i reading each ticker j, although in the discussion to follow the subscripts are omitted for each of understanding.

Once the propensities are computed, the logit transformation of the raw propensity scores may be computed as follows:

$$\rho = logit(\rho) = \log\left(\frac{\rho}{1-\rho}\right) \quad (2)$$

The logit transformation is used when modeling values ranging between zero and one so the response, logit($\rho$), better adheres to the assumptions of modeling methodologies, e.g., the linear model. A simple histogram shows the logit($\rho$) values to have a multi-modal distribution, but after making global adjustments for different contact reading behavior and ticker popularity, the transformed, adjusted propensities are effectively normally distributed.

In various embodiments, two types of global adjustments are made to the raw propensity scores: (i) a contact global adjustment that accounts for gross differences between contact readership (e.g., whether contacts read many or few tickers) and (ii) a ticker global adjustment that accounts for gross differences between ticker popularity (e.g., whether a ticker is read by many or few contacts). For instance, each contact has a mean level of interest across all tickers and each ticker has a mean level of interest across all contacts. There may be a contact global adjustment value for each contact that removes or otherwise accounts for the contact's mean level of interest across all tickers. Similarly, there may be a ticker global adjustment for each ticker that removes or otherwise accounts for the ticker's mean level of interest across all contacts.

After taking the contact reading rates and ticker popularity into account, the modeling attempts to explain variation in the adjusted logit-transformed propensity scores based on some or all of the derived variables identified in Table I above. Below is an example that shows how history is used to predict the ticker interest profile for a contact through time.

$$logit\left(\frac{\text{ticker\_docs\_read}}{\text{ticker\_docs\_available}}\right) =$$

$$X\beta = GlobalAdj_{contact} + GlobalAdj_{ticker} + \beta_1\text{Trades} + \beta_2\text{Holdings} +$$

$$\beta_3\text{num\_contacts\_reading} + \beta_4\text{ticker\_focus} + \beta_5\text{num\_tickers\_read} +$$

$$\beta_6\text{super\_interest} + \beta_7\text{changing\_interest\_slope} + \ldots$$

where X$\beta$ generically specifies a linear model with X representing the set of predictors and $\beta$ representing the model coefficients to estimate. Note that the global adjustments are additional $\beta$'s that are handled separately from the line model fit because there are many of them; one for each contact and one for each ticker. The variables used may include some or all of the direct and derived variables listed above. Team interest profiles may be estimated in a similar manner.

Figure 3:
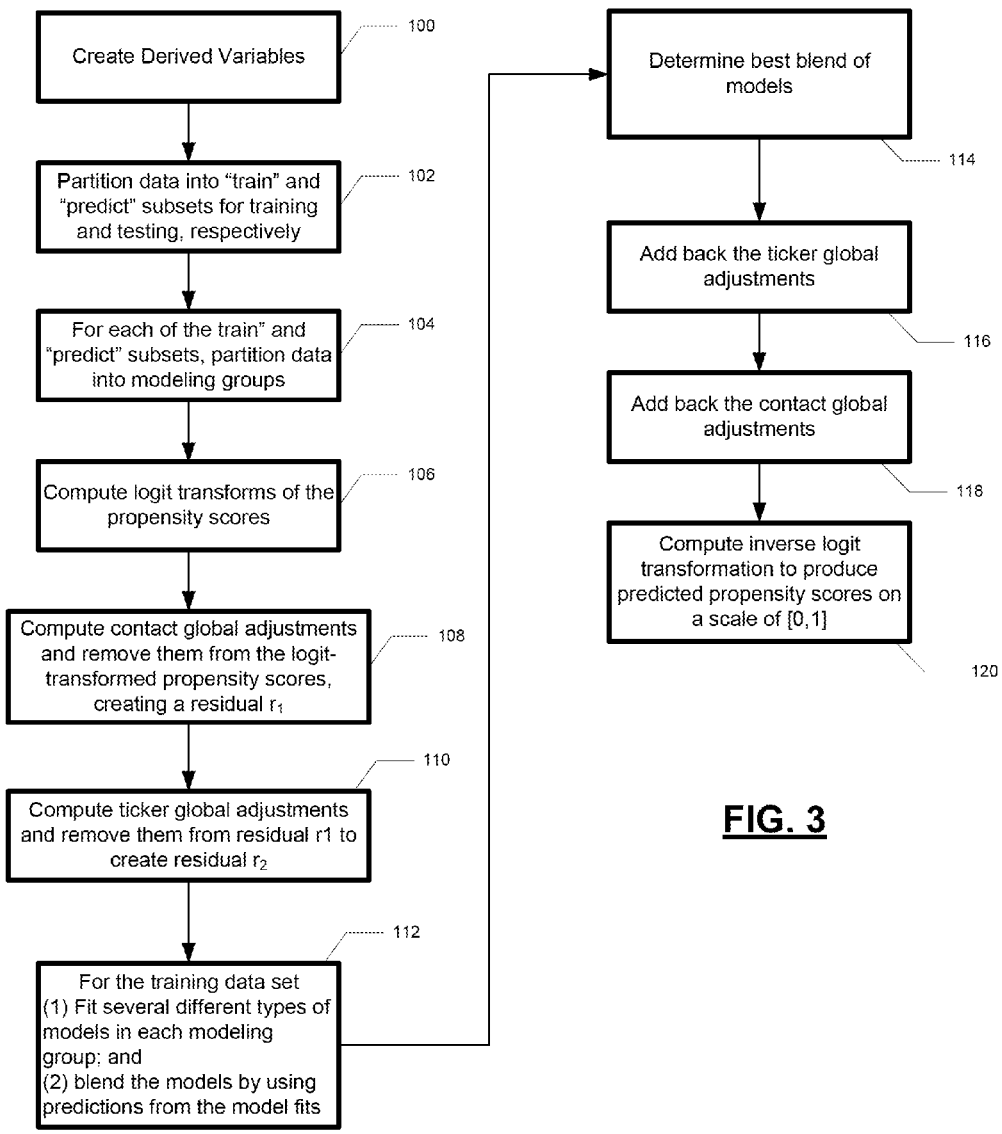

FIG. 3 is a diagram of a process that may be used by the model training module 20 to build and train the ticker direct model according to various embodiments of the present invention. Similar processes may be used for the ticker indirect and team direct models. At block 100, the derived variables are computed. The derived variables may be some or all of the variables (or others) listed above in Table I. Next, at block 102, the data is partitioned in "train" and "predict" subsets for training and testing, respectively, of the models. Next, at block 104, for each of the "train" and "predict" subsets, the data is partitioned into distinct modeling groups. For example, as described above, for the ticker direct model, the contacts may be partitioned based on the number of tickers read; for the team direct model, the contacts may be partitioned based on the number of teams read; and for the ticker indirect model, the contacts may be partitioned based on the K-Means clustering.

Next, at block 106, the logit transform of the propensity scores are computed using equations (1) and (2) above. Next, at block 108, the contact global adjustments, $c_i$, are computed and removed from the logit-transformed propensity scores, creating a residual $r_{1,ij}$=logit($\rho_{ij}$)–$c_i$, where i indexes the contact and j indexes the ticker. Next, at block 110, the ticker global adjustments, $t_j$, are computed and removed from the residuals $r_{1,ij}$ to create residual $r_{2,ij}$=$r_{1,ij}$–$t_j$. Next, at block 112, for the training data set, several different types of continuous, regression-type models are fit to $r_2$ in each modeling group. The different types of models may comprise linear models, tree models, neural networks, the CHAID model, or any other suitable model. Then the models are blended, preferably optimally, by using predictions obtained from the models fits to $r_2$ to predict $r_2$. At block 114, the test data set is used to determine the best blend of models by comparing fits for different combinations and blends of models.

With the preferred combination and blend of models determined, $r_2$ is transformed back to the original propensity by, at block 116, adding back the ticker global adjustments and, at block 118, adding back the contact global adjustments. Then, at block 120, the inverse logit transformations may be computed to produce predicted propensity scores on a scale of [0,1].

The contacts' adjusted propensity scores may be computed by the model training module 20 periodically or from time to time, such as every two weeks, monthly, or some other suitable frequency. The contacts' propensity scores may be stored in the model specifications data store 94. Periodically or from time to time, the contacts interest profiles may be computed and stored in the contact interest profile file data store 96 by the model scoring module 22. The model scoring module 22 may score the model using the propensity scores computed from training the models and the contact data (readership data, interaction data, trades and holdings, etc.) stored in the contact data store 90.

In addition, in various embodiments, a research work product type score may be computed for each contact. In one embodiment, a contact's research work product type score for a given research work product type may be computed by determining the percentage of the research work product of the given type read by the subject contact. For example, if 36% of the research work product read by the subject contact over the observation period was research reports, the subject contact's research work product type score for research reports would be 0.36. The subject contact's broker vote score for each research work product type may be computed in a similar manner. Research work product type data may be stored in the work product data store 92. In other embodiments, the work product type score is only used as a filter. That is, a particular work product item is only distributed to a contact if the contact has accessed that type of work product before (or within a certain time period). For example, models are only provided to contacts that have accessed models previously.

Also as explained above, a geographic region/sub-region interest score may be computed for each contact as part of their interest profile. The geographic region/sub-region interest score may indicate the geographic region/sub-regions of the tickers and/or analyst teams in which the contact has an interest. In various embodiments, the geographic region/sub-region interest score may be used as a filter; a particular work product item is only distributed to a contact if the contact has previously accessed work product pertaining to the same geographic region or sub-region (or within a certain time period).

The work product recommendation module 23 may be used to determine each contact's interest in research work product generated by the equity research group. The recommendations computed by the work product recommendation module 23 may be based on at least (i) the interest profile data of the contacts stored in the contact interest profile data store 96 and (ii) data about the research work product, such as the ticker(s) and analyst team(s) to which the research work product pertains, which data may be stored in the work product data store 92. In one embodiment, the interest profile data on which the recommendations are made include the contacts' team and ticker interest scores, the contacts' research work product type score, and/or the contacts' geographic region/sub-region score.

Figure 4:
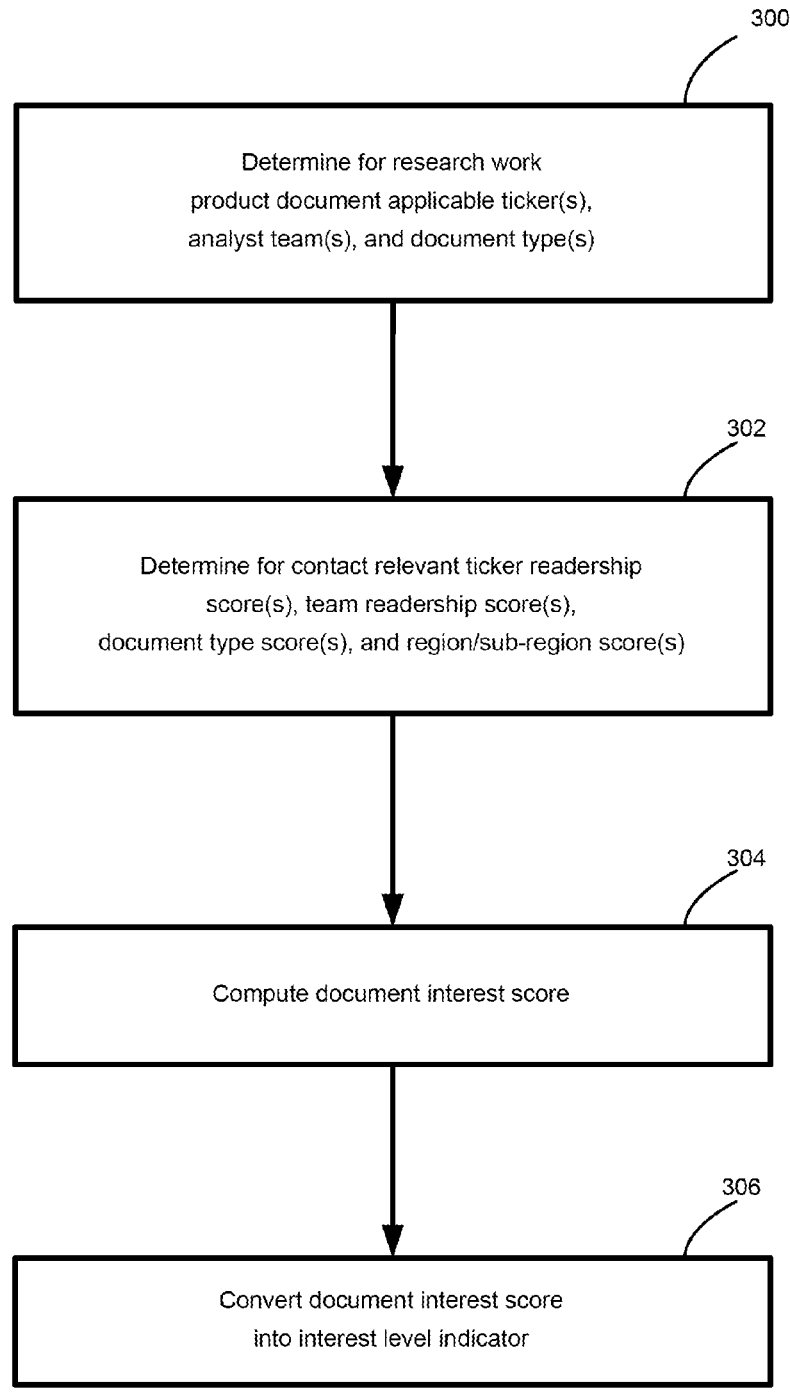

FIG. 4 is a diagram of a process flow of the processor 14 when it executes the work product recommendation module 23 according to various embodiments of the present invention. The process flow shown in FIG. 4 illustrates an example process for determining an interest level of one contact (the subject contact) for one research work product (i.e., document). The process of FIG. 4 may be repeated by the computer system 10 for each research work product of the equity research department meeting certain criteria (e.g., generated within the last N hours, days, months, etc.) and for multiple (preferably all) contacts of the equity research department. The process of FIG. 4 starts at block 300, where the applicable ticker(s), analyst team(s), research work product type, and/or geographic region/sub-region for the document are determined. This data may be stored in the work product data store 92, such as in the form of metadata or tags associated with the document. For the sake of example, assume that the document pertains to two tickers (ABC and DEF), was generated by analyst team 111, is a research report, and the two tickers (ABC and DEF) are North American companies.

In one embodiment, at block 302, the relevant ticker readership, team readership, and research work product type scores for the subject contact are determined. This data may be stored in the contact interest profile data store 96. In the example, the subject contact's propensity scores for tickers ABD and DEF would be used, the subject contact's propensity score for analyst team 111 would be used, and the subject contact's score for research reports would be used. For embodiments, where geographic region and/or sub-region scores are used, they too may be computed at block 302. Such geographic region and/or sub-region scores may indicate the likelihood of a contact to read research work product pertaining to a particular geographic region and/or sub-region (or research work product pertaining to tickers or industry sectors in or associated with a particular geographic region and/or sub-region). In some embodiments, the geographic region and/or sub-region scores may be computed as the ratio of the contact's readership of research work product pertaining to a particular geographic region or sub-region over a time period to the total number of research work product items produced by the research department over the time period pertaining to the geographic region or sub-region.

At step 304, a document interest score is computed. In one embodiment, the document interest score is based on a weighted sum of at least the maximum ticker readership score, the maximum team readership score, and the maximum research work product type score for the research work product document. For example, assume the following scores for the subject contact:

|  | Score |
|---|---|
| Ticker |  |
| ABC | 0.282663 |
| DEF | 0.40623 |
| Team |  |
| 111 | 0.083333 |
| Doc Type |  |
| Research | 0.001505 |

In this example, because there is only one applicable analyst team and document type, the subject contact's scores for the applicable analyst team and document type are used to compute the document interest score. Because there are two relevant tickers, in one embodiment the maximum of the two ticker scores is used (in this example, 0.406230 for ticker DEF). In this case, if each score (ticker, team, type) is equally weighted, the subject contact's document interest score for the document is 0.406230+0.083333+0.001505=0.491068. In other embodiments, where there are multiple applicable scores, such as where the documents pertains to multiple tickers, a score other than the maximum score could be used, such as an average or some other combination of the scores. In another embodiment, a document may be scored differently based on a content. For example, a report that focuses on only one company may be evaluated based only on its ticker scores while a report based on an entire industry would be evaluated based on its team scores. For embodiments that use geographic region and/or sub-region scores, they may also be used to compute the document interest score. For example, if the document pertains to a particular geographic region (or pertains to a ticker or industry sector in the particular geographic region), the contact's geographic region score may be added to the contact's ticker, team and document type scores. Similarly, if the document pertains to a particular geographic sub-region (or pertains to a ticker or industry sector in the particular geographic sub-region), the contact's geographic sub-region score may be added to the contact's ticker, team and document type scores.

Next, at step 306 the document interest score is converted to a document interest level. In one embodiment, the subject contact's interest level in a document is indicated by a numerical scale of indicators, such as one to five stars. In one embodiment, each document interest score directly translates to a number of indicators (or a bucket) as the interest level indicator. For example, the following buckets could be used:

TABLE III

| Score | Number of Stars |
|---|---|
| score > 0.5 | Five |
| 0.4 < score ≤ 0.5 | Four |
| 0.3 < score ≤ 0.4 | Three |
| 0.2 < score ≤ 0.3 | Two |
| score ≤ 0.2 | One |

Continuing with the example, in this case the subject contact's interest level in the document would be four stars (since 0.4<0.491068≤0.5). Of course in other embodiments, different numerical ranges for the buckets and/or a different number of buckets could be used.

In one embodiment, the same buckets and numerical ranges for the buckets may be used for each combination of contact and research document. In other embodiments, the bucket ranges may be specific to the contact or document. For example, if the buckets were specific to the contact, the contact's document interest score for each document (from a certain time period) may be computed, and then the mean ($\mu$) and standard deviation ($\sigma$) of the contact's document interest scores may be computed. In one such embodiment, the contact's document interest scores may be converted to interest levels based on the following buckets:

TABLE IV

| Score | Number of Stars |
|---|---|
| score > ($\mu$ + 2$\sigma$) | Five |
| ($\mu$ + $\sigma$) < score ≤ ($\mu$ + 2$\sigma$) | Four |
| ($\mu$ − $\sigma$) < score ≤ ($\mu$ + $\sigma$) | Three |
| ($\mu$ − 2$\sigma$) < score ≤ ($\mu$ − $\sigma$) | Two |
| score ≤ ($\mu$ − 2$\sigma$) | One |

In a similar manner, if the buckets were specific to the document, the document interest score for each contact may be computed, and then the mean ($\mu$) and standard deviation ($\sigma$) of the contact document interest scores may be computed. The scores may then be converted to buckets based on the mean ($\mu$) and standard deviation ($\sigma$).

In other embodiments, as described above, the document type and the geographic region/sub-region scores may be used as filters. That is, for example, the contact's interest level in the document may be adjusted down to one or zero if the contact has never previously read this type of report (e.g., a research document in this example) and/or never previously read reports about tickers in this geographic region or sub-region (e.g., North America in this example)

In the example of FIG. 4, some of the steps could be performed in different orders or concurrently. For example, the contact's interest scores could be determined (or retrieved) prior to determining (or retrieving) the relevant meta data for the research document, or the steps could be performed concurrently. Also, if the contact's interest profile comprises other types of interest scores that can be associated with the meta data for a research document, such as sector scores or some other score associated with the research document, such other contact interest scores could be used in addition to or in lieu of the readership, analyst team, document type, and/or geographic region/sub-region scores for the contact.

Once the contacts' interest levels in the work product items are determined, the work product items may be disseminated or otherwise distributed to the contacts. U.S. provisional patent application Ser. No. 61/495,194, filed Jun. 9, 2011, entitled "Computer-based Systems and Methods for Distributing Research Work Product Produced by a Research Department to Contacts of the Research Department," discloses mechanisms for disseminating the work product items to the contacts of the research department. This application is incorporated herein by reference in its entirety.

Figure 5:
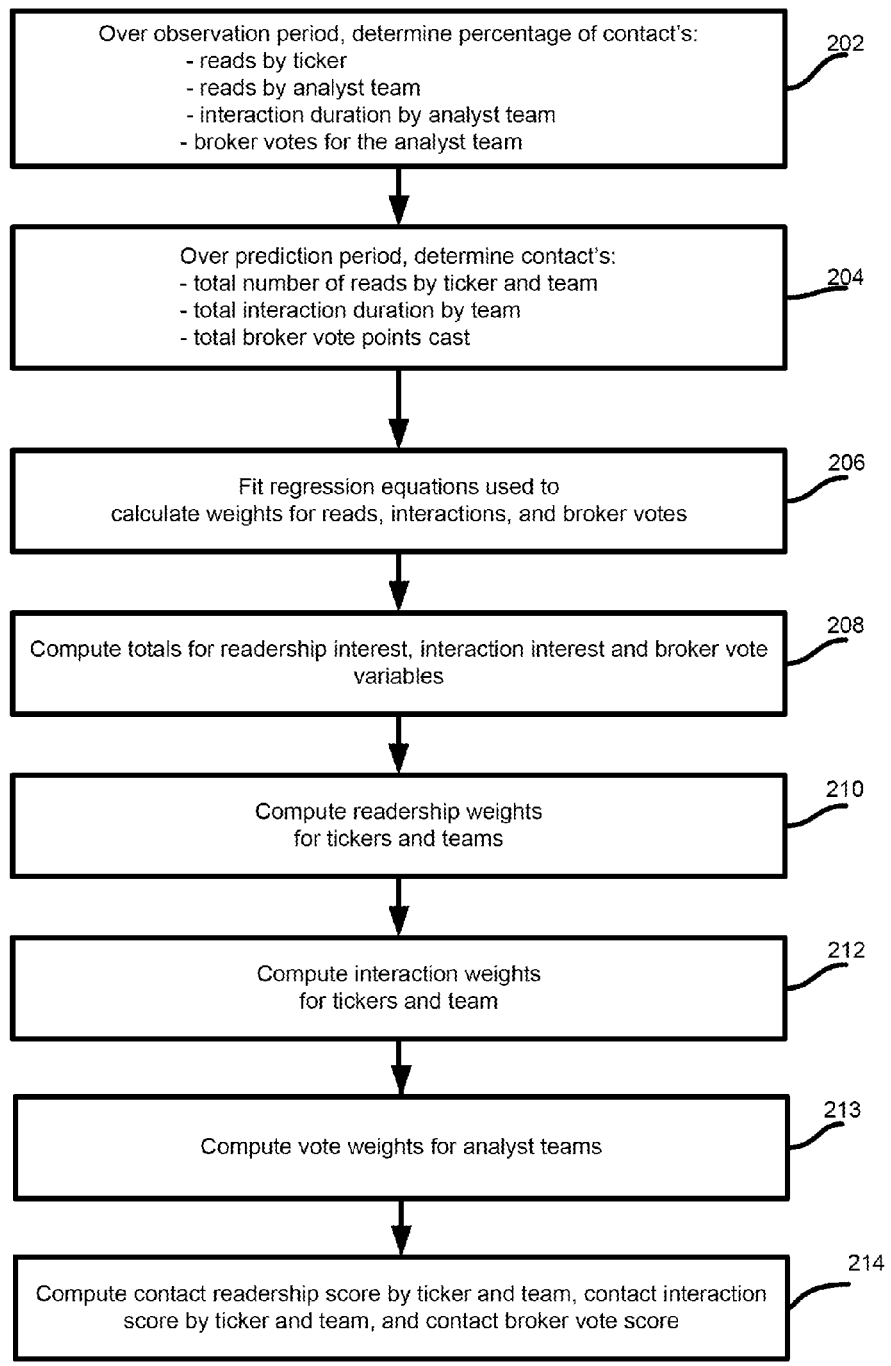
Figure 6:
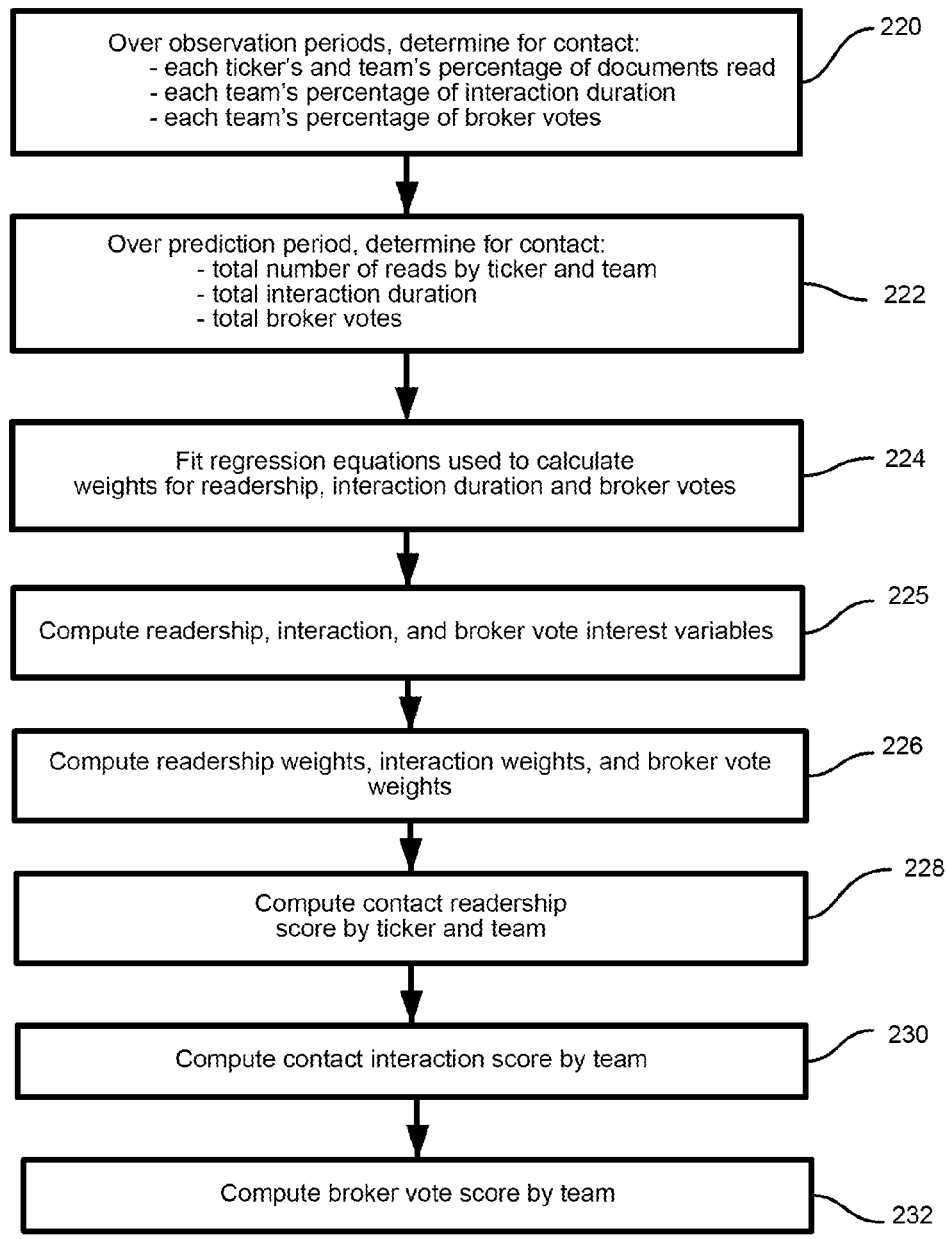

In other embodiments, a scoring model may be used instead of (or in addition) to a propensity model to determine the contacts' interest profiles. FIGS. 5 and 6 are flowcharts of example processes that may be performed by the processor 14 of the computer system 10 to compute such (i) topic/ticker and team readership scores, (ii) team interaction scores, and/or (iii) broker vote scores when executing the code of the model scoring module 21 according to such an embodiment. The FIG. 5 embodiment is a contact-centric scoring model and the embodiment of FIG. 6 is a document-centric scoring model. In other embodiments, just the ticker/team readership scores could be computed or just the interaction scores could be computed or just the broker vote scores could be computed, or some combination of those scores could be computed. In addition or alternatively, readership and interaction scores could be computed based on parameters other than ticker or analyst team, such as by industry, market or sector (such as industries, markets or sectors defined by the Global Industry Classification Standard (GICS) or the Industry Classification Benchmark (ICB)).

The scoring model embodiments of FIGS. 5 and 6 utilize both so-called observation and prediction periods, that are both referenced to a recommendation period. The recommendation period may be the time period during which the equity research department is determining which research work product to recommend to its contacts. As such, the recommendation period may be the current day. The observation and prediction periods may be time periods that comprise one or more past (or historical) time period units, preferably for which contact interaction data (e.g., documents reads, phone calls, etc.) is available. For example, the prediction period could be $N_p$ time period units prior to a current time period, and the observation period may be $N_o$ time period units prior to the current time period. In various embodiments, a time period unit is one month, although other time period units may be used. In various embodiments, the prediction period could be one time period unit (e.g., one month) before the recommendation period ($N_p=1$), and the observation period is two to four time period units (e.g., two to four months) before the recommendation period ($N_o=2$ or $N_o=4$).

The processes of FIGS. 5 and 6 illustrate example processes for one contact ("the subject contact"). The computer system 10 may execute one or both of the processes for multiple (and preferably all) contacts of the equity research department periodically or from time-to-time (e.g., every business day, every week, etc). The process of FIG. 5 starts at block 202 where, for example, over the observation, the percentage of the subject contact's percentage of reads by ticker and analyst team are computed, as well as the subject contact's percentage of interaction duration with each analyst team. These computations may be performed based on data stored in the contact data store 90. For example, if the subject contact read one hundred (100) research documents over the observation period, and if thirty of the ones the subject read over the observation period pertained to a particular ticker (say ticker ABC, for the sake of example), the subject contact's percentage of reads for ticker ABC would be 30% (or 0.30); if the contact read twenty five (25) reports on ABC, the contact's percentage would be 25% (or 0.25), and so on. Similarly, if forty (40) of the documents that the subject contact read over the observation period were generated by a particular analyst team (say analyst team number 111, for the sake of example), the subject contact percentage's of reads for analyst team 111 would be 40% (or 0.40); if the contact read thirty-five (35) from analyst team 111, the subject contact's percentage would be 35% (or 0.35) for analyst team 111, and so on. For the contact's interaction duration percentage for analyst team 111, the total duration of phone calls between analyst team 111 and the contact during the observation period could be divided by the cumulative duration of all calls that the client had with all analyst teams. For example, if the contact's call duration for the observation period with analyst team 111 was fifteen (15) minutes, and the cumulative duration of all calls that the client had with all analyst teams during the observation period was seventy-five (75) minutes, the contact's interaction duration percentage for analyst team 111 would be 20% (or 0.20). At block 202 the computer system 10 may also compute the percentage of the subject contact's broker votes given to particular analyst teams of the equity research department over the observation period.

In the context of block 202 of FIG. 5, a subject contact's broker vote score for a given analyst team may be computed by determining the percentage of the subject contact's total broker vote points that the subject contact awarded during the observation period to the given analyst team. For example, if the subject contact awarded 40% of his/her total broker vote points to analyst team 111, the contact's broker vote score for analyst team 111 would be 0.40. The subject contact's broker vote score for each analyst team may be computed in a similar manner. Broker vote data may be stored in the contact data store 90.

At block 204, the subject contact's total number of reads by ticker and team over the prediction period are determined based on, for example, the contact data, as well as the total interaction duration of the subject contact for each respective analyst team. Also at block 204, in embodiments where broker votes are used to determine the subject contact's interest profile, the total number of broker votes cast by the subject contact over the prediction period are determined, based on, for example, broker vote data in the contact data store 90.

Next, at block 206, regression equations to be used to calculate ticker, team and broker vote weights for readership and interactions may be fit. For example, for tickers or teams, the percentage of all of the subject contact's reads for all tickers or teams determined at block 202 may be denoted as X, and the total number of reads for all tickers or teams determined at block 204 may be denoted as Y, the following equation may be solved:

$$Y=\beta_{read}X$$

where $\beta_{read}$ is the ticker or team regression coefficient for estimating the linear relationship between ticker or team reads (Y) and the percentage of ticker or team reads (X). Similarly, all percentages of subject contact interaction durations with some team determined at block 202 may be denoted as X, and all interaction durations with some team determined at block 204 may be denoted as Y, the following equation may be solved:

$$Y=\beta_{interaction}X$$

where $\beta_{interaction}$ is team regression coefficient for estimating the linear relationship between team interactions (Y) and the percentage of team interactions (X). In a similar manner, the a regression coefficient for broker votes could be determined at block 206 (e.g., $Y=\beta_{vote}X$).

Next, at block 208, the total beta ratio for the readership and interaction variables are determined. In one embodiment, the total beta ratio for readership may be computed as:

$$\frac{1}{\beta_{read,ticker}} + \frac{1}{\beta_{read,team}} = \beta_{read,total}$$

The total beta ratio for the interaction variable may be computed as:

$$\frac{1}{\beta_{interact,ticker}} = \beta_{interact,total}$$

For embodiments where broker votes are used, beta ratios for the broker vote variable may be $$\left(\text{e.g.,} \frac{1}{\beta_{vote,team}} = \beta_{vote,total}\right).$$

determined at block 208

Next, at block 210, the readership weights (W) may be computed for all teams and tickers, where, in one embodiment:

$$W_{read,ticker} = \frac{(1/\beta_{read,ticker})}{\beta_{read,total}}$$

$$W_{read,team} = \frac{(1/\beta_{read,team})}{\beta_{read,total}}$$

Next, at block 212, the interaction weights (W) may be computed for all teams, where, in one embodiment:

$$W_{read,team} = \frac{(1/\beta_{interact,team})}{\beta_{interact,total}}$$

Next, at block 213, broker vote weights per team ($W_{brokervote,team}$) may be computed. In one embodiment, the broker vote weights by team may be computed as:

$$W_{vote,team} = \frac{(1/\beta_{vote,team})}{\beta_{vote,total}}$$

Next, at block 214, the subject contact's readership scores by ticker and team are computed. In one embodiment, the subject contact's readership scores may be determined based on at least (i) the subject contact's percentage of reads by ticker and team determined at block 202 and (ii) the readership weight by team or ticker determined at block 210. For example, in one embodiment, the subject contact's readership score may be determined based on a product of (i) the subject contact's percentage of reads by ticker and team determined at block 202 and (ii) the readership weight by team or ticker. For example, if the subject contact's percentage of reads for ticker ABC was 80% and the readership weight for tickers was 0.20, then the subject contact's readership score for ticker ABC would be 0.16. In a similar manner, the subject contact's readership score for each ticker and team could be computed.

Also at block 214, the subject contact's interaction scores by team are computed. In one embodiment, the subject contact's interaction scores may be determined based on at least (i) the subject contact's percentage of interaction duration by team determined at block 202 and (ii) the subject contact's interaction weight by team determined at block 212. For example, in one embodiment, the subject contact's readership score may be determined based on a product of (i) the subject contact's percentage of interaction duration by team determined at block 202 and (ii) the team interaction weight determined at block 212. In a similar manner, the subject contact's interaction score for each analyst team could be computed. Also at block 214, the subject contact's broker vote scores by team may be computed. In one embodiment, the subject contact's broker votes scores may be determined based on at least (i) the subject contact's percentage of broker vote by team determined at block 202 and (ii) the subject contact's broker vote weight by team determined at block 213. The subject contact's contact profile may comprise the collection of (i) the subject contact's readership scores by team and/or ticker, (ii) the subject contact's interaction score by ticker and team, and/or (iii) the subject contact's broker vote score by teams. The scores for the subject contact's interest profile may be stored in the contact interest profile data store 96. In a similar manner, the interest profiles for the other contacts of the equity research department may be computed and stored.

FIG. 6 illustrates another process flow for determining a subject contact's ticker/team readership and interaction scores, as well as the broker vote sores, according to various embodiments. At block 220, over the observation period, each ticker's and team's percentage of documents read by the subject contact is determined. For example, if ten documents were generated by the equity research department pertaining to a particular ticker (say ticker ABC, for the sake of example), and if the subject contact read all ten of them, the contact's percentage of reads for ticker ABC would be 100% (or 1.00); if the contact read nine of them, the contact's percentage would be 90% (or 0.90), and so on. If a particular analyst team (say analyst team number 111, for the sake of example) produced twenty documents during the observation period, and the contact read all twenty of them, the contact percentage's of reads for analyst team 111 would be 100% (or 1.00); if the contact read nineteen of them, the contact's percentage would be 95% (or 0.95), and so on. Also at block 220, the subject contact's percentage of interaction duration for each team is determined. For example, for the subject contact's interaction duration percentage for analyst team 111, the total duration of phone calls between analyst team 111 and the subject contact during the observation period could be divided by the cumulative duration of all calls that the subject contact had with all analyst teams over the observation period. Also at block 220, the each analyst team's percentage of the broker vote points cast by the subject contact are determined.

Next, at block 222, the total number of reads by the subject contact over the prediction period by ticker and team is determined. In addition, the total interaction duration by team by the subject contact over the prediction period is determined. In addition, the total number of broker votes by the subject contact over the prediction period is determined. Next, at block 224, regression equations used to calculate weights for readership, interaction, and broker votes are fit. This may be similarly to block 206 of FIG. 5. Next, at block 225, readership, interaction and broker vote interest regression coefficients may be computed for ticker and team. This may be similarly to block 208 of FIG. 5. Next, at block 226, readership weights, interaction weights, and broker vote weights may be computed for ticker and team, as the case may be. This may be similarly to blocks 210-213 of FIG. 5. Next, at block 228, the subject contact's readership scores by ticker and team may be computed. This may be similarly to block 214 of FIG. 5. Next, at block 230, the subject contact's interaction scores by team may be computed. This may be similarly to block 214 of FIG. 5. Next, at block 232, the subject contact's broker vote scores by team may be computed. This may be similarly to block 214 of FIG. 5.

In various embodiments, certain constraints may be placed on the interest regression coefficients and/or weights. For example, in one embodiment, all interest regression coefficients $\beta$ must be positive and all weights W must also be positive. Another preferable constraint is that $W_{read,ticker} > W_{read,team}$. In addition, in various embodiments, the contact interest module 20 may compute validity parameters, such as hit rates for individual contacts. One possible hit rate is the ratio of the number of recommended documents read by a contact to the total number of documents recommended to the contact. The contact's interest profile may be adjusted based on such validity testing, with the adjusted interest profiles stored in the contact interest profile data store 96.

In various embodiments, the reads and/or interactions by the subject contact may be weighted based on time when determining the contact's interest profile. For example, more recent reads and/or interactions by the contact may be weighted more heavily than reads and/or interactions that were not recent. For example, reads and/or interactions that occurred within the last ninety (90) days may have a weighting factor of R, reads and/or interactions that occurred within ninety-one (91) to one hundred eighty (180) days may have a weighting factor of S, and reads and/or interactions that occurred more than one hundred eighty (180) days ago may have a weighting factor of T, where R>S>T. In other embodiments, different weighting factors and/or time bands may be used.

The model scoring module 21 in such an embodiment may also compute team and ticker interest scores for each contact. The subject contact's ticker interest scores may be computed mathematically based on the contact's readership and interaction scores for the tickers. For example, the subject contact's ticker interest scores may be a weighted average of the subject contact's readership and interaction scores for the tickers. Similarly, the subject contact's team interest scores may be computed mathematically based on the subject contact's readership, interaction and/or broker vote scores for the teams. For example, the subject contact's team interest scores may be a weighted average of the subject contact's readership, interaction and broker vote scores for the teams. These scores for each contact may be stored in the contact interest profile data store 96. The scores may be scaled so that they are within a desired range, such as 0.000 to 1.000 for example, or some other desired range.

Once the scoring model ticker and team interests scores are determined for the contacts, the work product scores may be determined by the work product scoring module 22 as described above. Just like the propensity model, the scoring model embodiment may additionally use the work product type scores and/or geographic region/sub-region scores to compute the work product scores and/or to filter work product items distributed to contacts.

It will be apparent to one of ordinary skill in the art that at least some of the embodiments described herein may be implemented in many different embodiments of software, firmware, and/or hardware. The software and firmware code may be executed by a processor circuit or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary.

A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein

What is claimed is:

1. A computer system for computing an interest score for one or more contacts of a research entity that produces research work product items that individually cover one or more of a plurality of topics, wherein the topics comprise at least one of publicly-traded stocks, industries, and geographic regions, wherein the one or more contacts are associated with accounts for holding and trading publicly-traded securities, and wherein the research entity comprises a plurality of teams that produce the research work product items, the computer system comprising:
   a computer-based data storage system that stores data relating to the contacts and the research work product items produced by the entity;
   at least one processor in communication with the computer-based data storage system; and
   at least one computer memory device in communication with the processor, wherein the at least one computer memory device stores instructions that when executed by the at least one processor causes the at least one processor to compute a work product item interest scores for the one or more contacts for one or more work product items produced by the research entity, wherein the work product item interest score for a particular contact and a particular work product item is indicative of the particular contact's likely interest in the particular work product item, wherein the at least one processor is programmed to compute the work product item interest scores by performing steps comprising:

determining for the one or more contacts at least one of the following sub-interest scores:
  a stock sub-interest score for one or more of the stocks, wherein the stock sub-interest score for a stock for a contact is a score indicative of the contact's interest in accessing research pertaining to the stock; and
  a team sub-interest score for one or more analyst teams of the research entity, wherein the team sub-interest score for an analyst team for a contact is a score indicative of the contact's interest in accessing research from the analyst team; wherein the sub-interest scores are determined using one or more mathematical models, wherein the one or more mathematical models uses a plurality of derived variables that are indicative of the one or more contacts' interest in the stocks and/or analyst teams, wherein the plurality of derived variables comprise at least one of the following derived variable:
    a first derived variable that is based on data regarding the research work product items produced by the entity that were accessed by the one or more contacts;
    a second derived variable that is based on data regarding communication interactions between the one or more contacts and the teams of the research entity;
    a third derived variable that is based on broker votes by the one or more contacts;
    a fourth derived variable that is based on stock trades of the accounts associated with the one or more contacts; and
    a fifth derived variable that is based on stock holdings of the accounts associated with the one or more contacts;
computing the work product interest scores for the one or more contacts for work product items produced by the entity, wherein the work product interest score for one contact for one work product item is computed by summing a plurality of weighted summands, wherein the plurality of weighted summands comprise the at least one of the:
  the stock sub-interest score for the contact for the one or more stocks to which the work product item pertains; and
  the team sub-interest score for the contact for the team that generated the work product item, wherein:
    data indicating the one or more stocks covered by each research work product item produced by the research entity are stored in the computer-based data storage system; and
    data indicating which team produced each research work product item produced by the research entity are stored in the computer-based data storage system, and
wherein the work product interest scores are for use by the research entity in notifying the one or more contacts about the work product items.

2. The computer system of claim 1, wherein:
the computer-based data storage system further stores:
  trade data regarding trades of stocks by the accounts associated with the contacts; and
  holdings data regarding holdings of stocks by the accounts associated with the contacts.

3. The computer system of claim 1, wherein the one or more mathematical models comprise one or more propensity models.

4. The computer system of claim 3, wherein the one or more propensity models are trained by blending two or more continuous regression-type models.

5. The computer system of claim 3, wherein the one or more propensity models comprise a blend of two or more propensity models.

6. The computer system of claim 1, wherein:
determining at least one of the stock sub-interest score and the team sub-interest score comprises determining both the stock sub-interest score and the team sub-interest score; and
the plurality of weighted summands used to compute the work product interest scores comprises both the stock sub-interest score and the team sub-interest score.

7. The computer system of claim 1, wherein the plurality of derived variables used by the one or more mathematical models comprises at least two of the first derived variable, the second derived variable, the third derived variable, the fourth derived variable, and the fifth derived variable.

8. The computer system of claim 7, wherein the plurality of derived variables used by the one or more mathematical models comprises at least the first and second derived variables.

9. The computer system of claim 8, wherein the plurality of derived variables used by the one or more mathematical models comprises at least a sixth derived variable that is based on data regarding a type of the research work product items, wherein the types of research work product items include at least one of:
  research work product items that change a rating for a stock;
  research work product items that identify a target price movement for a stock; and
  research work product items that change an earnings estimate for a stock.

10. A computer-implemented method for computing an interest score for one or more contacts of a research entity that produces research work product items that individually cover one or more of a plurality of topics, wherein the topics comprise at least one of publicly-traded stocks, industries, and geographic regions, wherein the one or more contacts are associated with accounts for holding and trading publicly-traded securities, and wherein the research entity comprises a plurality of teams that produce the research work product items, the method comprising:
  storing data in a computer-based data storage system, wherein the stored data comprises data relating to the one or more contacts and the research work product items produced by the entity;
  computing, by a computer system in communication with the computer-based data storage system, a work product item interest scores for the one or more contacts for one or more work product items produced by the research entity, wherein the work product item interest score for a particular contact and a particular work product item is indicative of the particular contact's likely interest in the particular work product item, wherein the work product item interest scores are computed by performing steps comprising:

determining for the one or more contacts at least one of the following sub-interest scores:
a stock sub-interest score for one or more of the stocks, wherein the stock sub-interest score for a stock for a contact is a score indicative of the contact's interest in accessing research pertaining to the stock; and
a team sub-interest score for one or more analyst teams of the research entity, wherein the team sub-interest score for an analyst team for a contact is a score indicative of the contact's interest in accessing research from the analyst team;
wherein the sub-interest scores are determined using one or more mathematical models, wherein the one or more mathematical models uses a plurality of derived variables that are indicative of the one or more contacts' interest in the stocks and/or analyst teams, wherein the plurality of derived variables comprise at least one of the following derived variable:
a first derived variable that is based on data regarding the research work product items produced by the entity that were accessed by the one or more contacts;
a second derived variable that is based on data regarding communication interactions between the one or more contacts and the teams of the research entity;
a third derived variable that is based on broker votes by the one or more contacts;
a fourth derived variable that is based on stock trades of the accounts associated with the one or more contacts; and
a fifth derived variable that is based on stock holdings of the accounts associated with the one or more contacts;
computing the work product interest scores for the one or more contacts for work product items produced by the entity, wherein the work product interest score for one contact for one work product item is computed by summing a plurality of weighted summands, wherein the plurality of weighted summands comprise the at least one of:
the stock sub-interest score for the contact for the one or more stocks to which the work product item pertains; and
the team sub-interest score for the contact for the team that generated the work product item, wherein:
data indicating the one or more stocks topics covered by each research work product item produced by the research entity are stored in the computer-based data storage system; and
data indicating which team produced each research work product item produced by the research entity are stored in the computer-based data storage system, and
wherein the work product interest scores are for use by the research entity in notifying the one or more contacts about the work product items.

11. The method of claim 10, wherein:
trade data regarding trades of stocks by the accounts associated with the contacts are stored in the computer-based data storage system; and
holdings data regarding holdings of stocks by the accounts associated with the contacts are stored in the computer-based data storage system.

12. The method of claim 10, wherein the one or more mathematical models comprise one or more propensity models.

13. The method of claim 12, wherein the one or more propensity models comprise a blend of two or more propensity models.

14. The method of claim 10, wherein:
determining at least one of the stock sub-interest score and the team sub-interest score comprises determining both the stock sub-interest score and the team sub-interest score; and
the plurality of weighted summands used to compute the work product interest scores comprises both the stock sub-interest score and the team sub-interest score.

15. The method of claim 10, wherein the plurality of derived variables used by the one or more mathematical models comprises at least two of the first derived variable, the second derived variable, the third derived variable, the fourth derived variable, and the fifth derived variable.

16. The method of claim 15, wherein the plurality of derived variables used by the one or more mathematical models comprises at least the first and second derived variables.

17. The method of claim 16, wherein the plurality of derived variables used by the one or more mathematical models comprises at least a sixth derived variable that is based on data regarding a type of the research work product items, wherein the types of research work product items include at least one of:
research work product items that change a rating for a stock;
research work product items that identify a target price movement for a stock; and
research work product items that change an earnings estimate for a stock.

* * * * *